Nov. 20, 1962  M. V. SCOZZAFAVA ETAL  3,064,892
SALES TRANSACTION REGISTERING APPARATUS
Original Filed Sept. 6, 1957  7 Sheets-Sheet 5
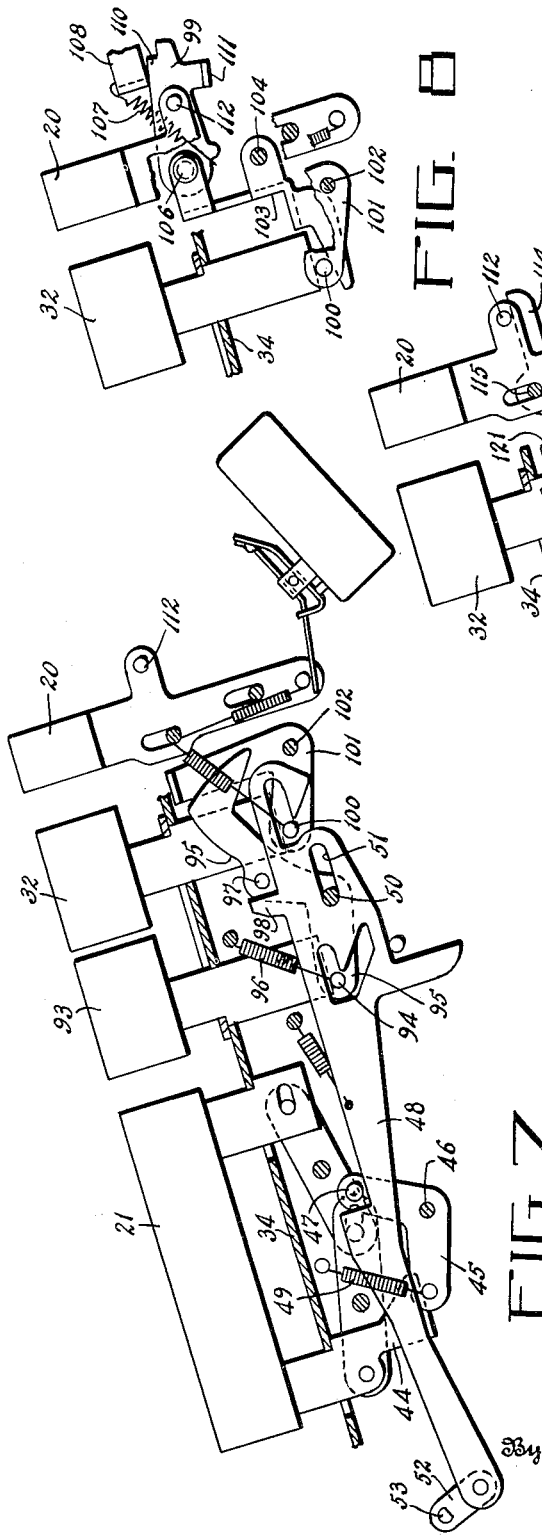
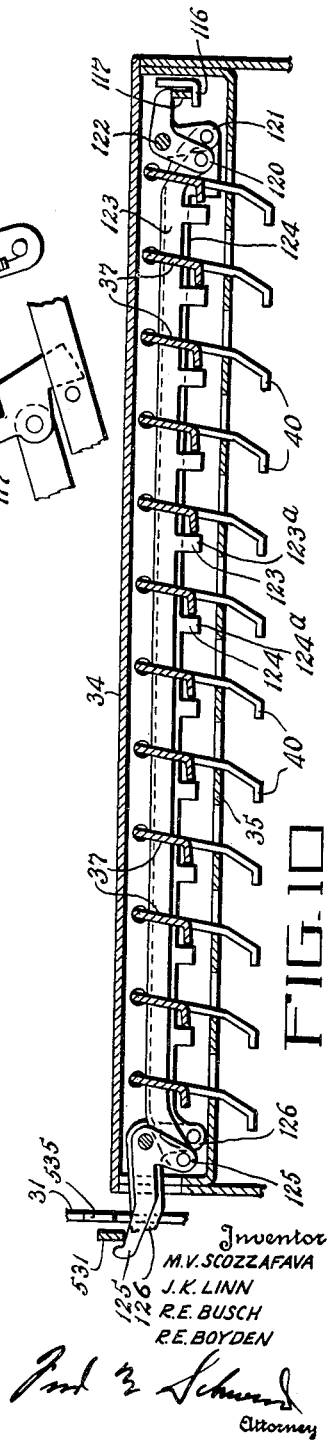
Inventor
M.V. SCOZZAFAVA
J.K. LINN
R.E. BUSCH
R.E. BOYDEN
Attorney

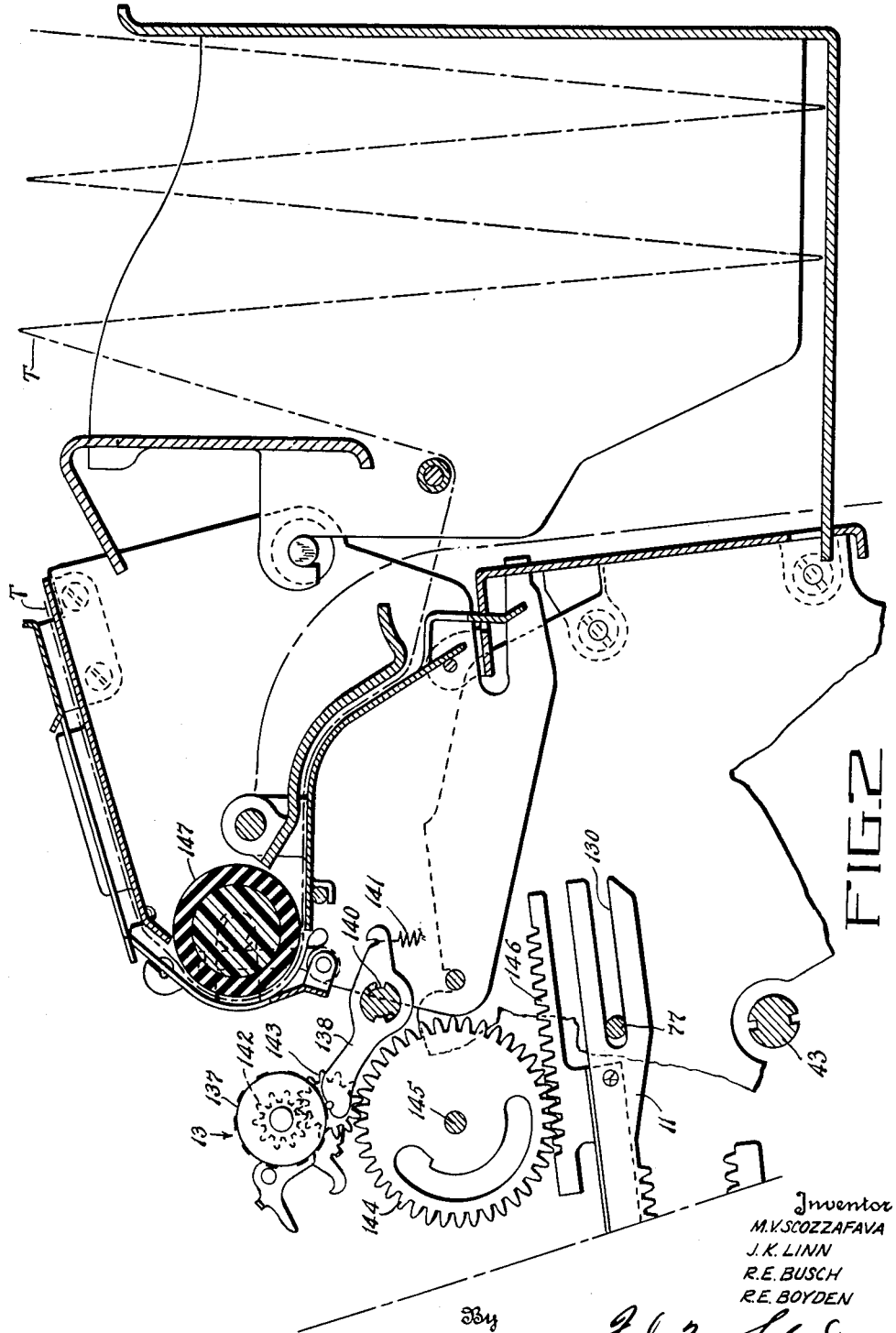

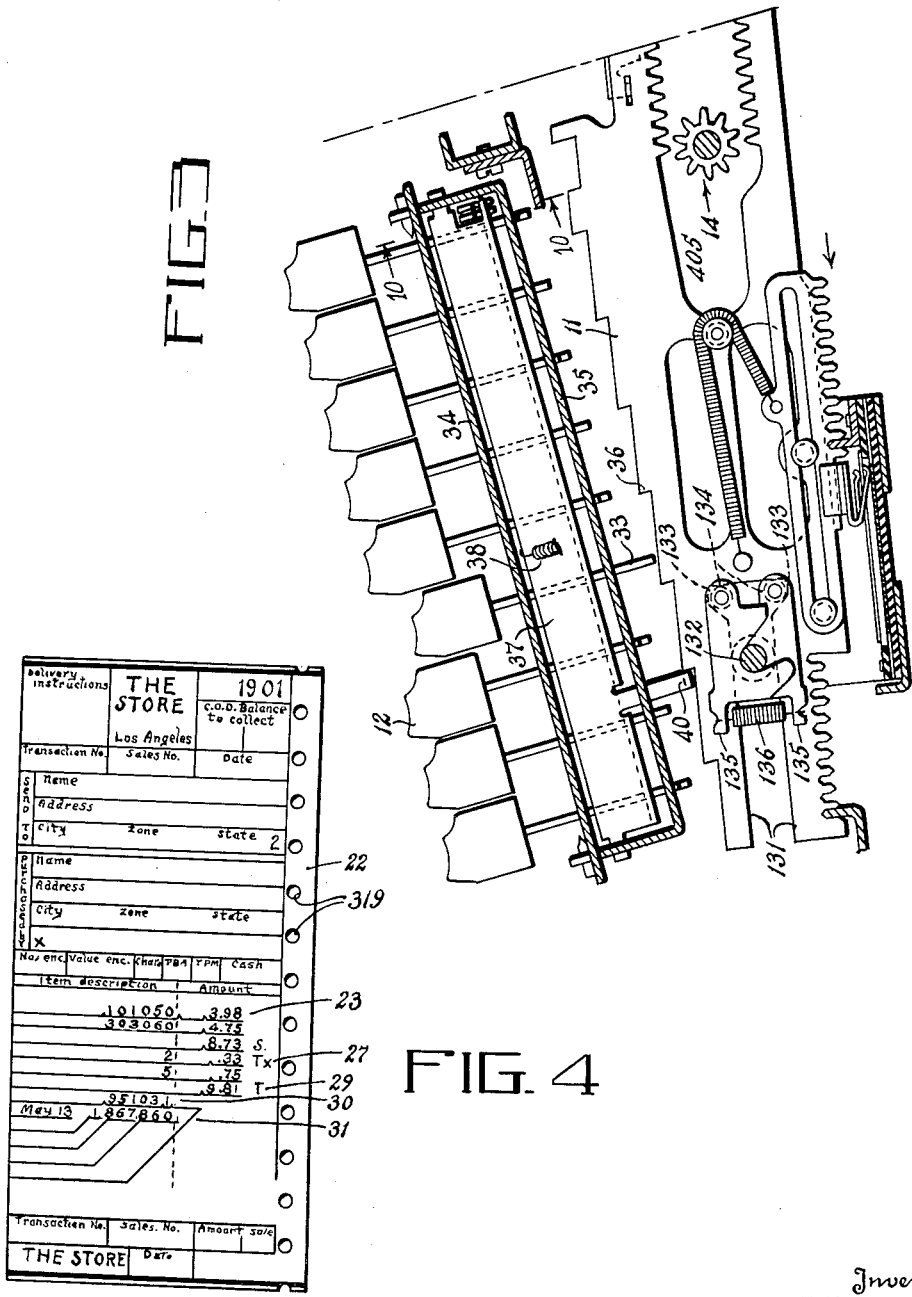

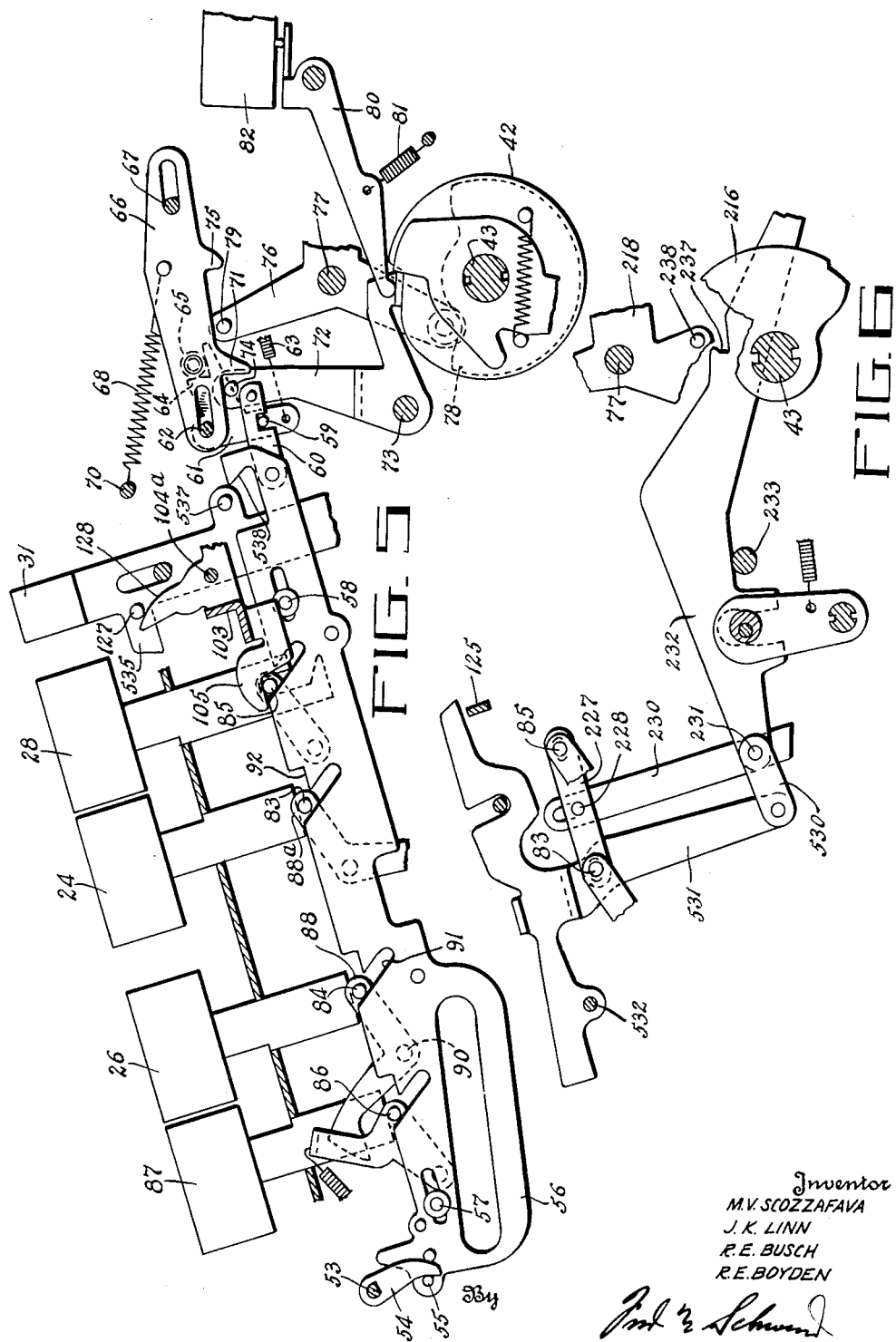

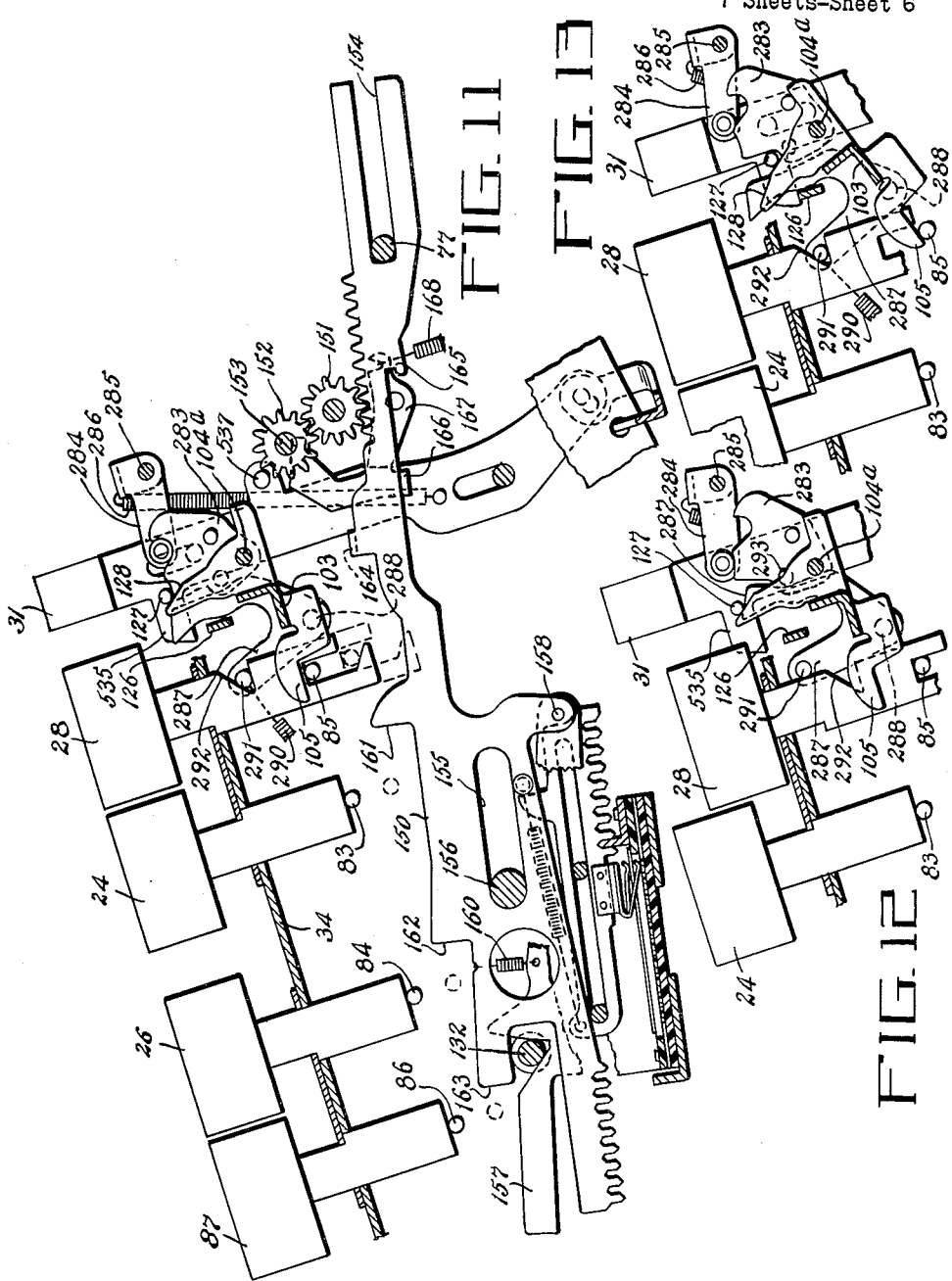

Nov. 20, 1962  M. V. SCOZZAFAVA ETAL  3,064,892
SALES TRANSACTION REGISTERING APPARATUS
Original Filed Sept. 6, 1957  7 Sheets-Sheet 7
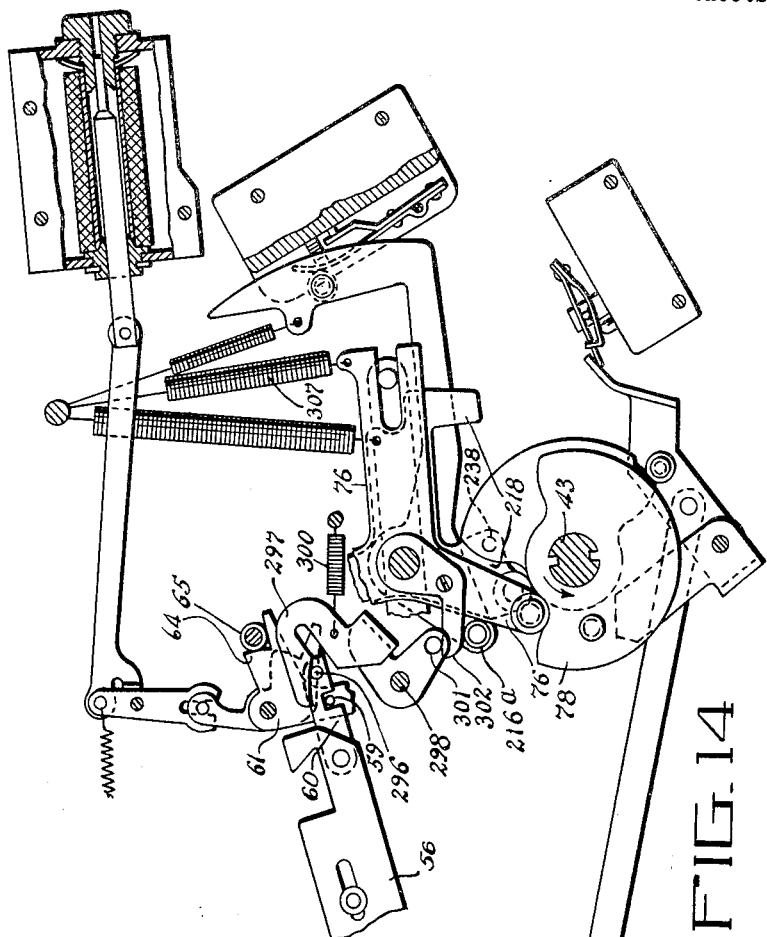
FIG.14
Inventor
M.V. SCOZZAFAVA
J.K. LINN
R.E. BUSCH
R.E. BOYDEN
By
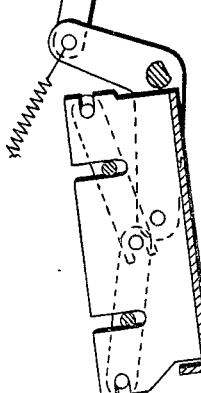
Attorney

United States Patent Office 3,064,892
Patented Nov. 20, 1962

3,064,892
SALES TRANSACTION REGISTERING
APPARATUS
Milton V. Scozzafava, Arcadia, John K. Linn, Los Angeles, and Richard E. Busch, La Puente, Calif., and Robert E. Boyden, Granby, Conn., assignors to Clary Corporation, San Gabriel, Calif., a corporation of California
Original application Sept. 6, 1957, Ser. No. 682,551, now Patent No. 3,017,081, dated Jan. 16, 1962. Divided and this application Apr. 29, 1960, Ser. No. 26,928
3 Claims. (Cl. 235—130)

This invention relates to sales transaction registering apparatus and has particular reference to point-of-sale registering equipment.

Heretofore, stores and other business transaction establishments have generally utilized cash registers to keep a record of the amount of money involved in sales transactions and to issue receipts of such transactions. The clerk identification number and possibly other identification matter was entered in the register and recorded on a printed record along with the amount of money involved in the transaction. The sales person also generally recorded a more detailed record in a sales book, pertaining to each sale, such as his identification number, department number, type or class of merchandise, price of the merchandise, tax, etc.

Later, the cash register record and the sales book record were forwarded to an accounting department where the records were correlated and were processed to compile statistics for inventory control, payroll, taxes, and other purposes. Also, statements were prepared from the sales book entries in the case of charge transactions.

The above procedure, although generally satisfactory, usually required considerable duplication in work in entering data in the cash register and in the sales book entries. Further, the correlation of the various records and additional handling of the same by the accounting department further increased the amount of clerical work and tended to introduce errors.

In the machine of the present invention, such additional information as the clerk identification number, merchandise identification number, type of goods, tax, etc., is entered into the machine and recorded at the point of sale, thus eliminating duplication of accounting work and errors in recording the same.

A principal object of the present invention is to reduce the possibility of unauthorized persons operating the machine and thereby recording erroneous information, without resorting to key locks.

Another object of the invention is to prevent advertent or inadvertent setting of amount and other control keys on a machine of the above type by unauthorized persons.

A further object is to provide means for enforcing a sequence of operations of a machine of the above type by an operator.

The manner in which the above and other objects of the invention are accomplished will be readily understood on reference to the following specification when read in conjunction with the accompanying drawings, wherein:

FIG. 2 is a longitudinal sectional view through the rear portion of the machine and is taken along line 2—2 of FIG. 1.

FIG. 3 is a longitudinal sectional view through the forward portion of the machine and is taken along line 3—3 of FIG. 1.

FIG. 4 is a facsimile of a sales check produced by the machine.

FIG. 5 is a sectional elevation view of the primary clutch and some of its controls.

FIG. 6 is a sectional elevation view of the controls for rocking the accumulator zero stop shaft and also for clearing the amount sections of the keyboard.

FIG. 7 is a sectional elevation view of certain of the machine control bars.

FIG. 8 is a sectional elevation view of the latch associated with the void and start control bars.

FIG. 9 is a fragmentary elevation view of the linkage for clearing the entire keyboard under control of the start key.

FIG. 10 is a sectional elevation view of a portion of the key release mechanism and is taken along line 10—10 of FIG. 3.

FIG. 11 is a sectional elevation view of the symbol rack and associated controls.

FIG. 12 is a view of certain parts shown in FIG. 11 in positions effected by depression of the total bar.

FIG. 13 is a view of the parts shown in FIG. 12 in positions effected by depression of the start key.

FIG. 14 is a sectional elevation view of controls associated with the clutch controls.

Figure 1:
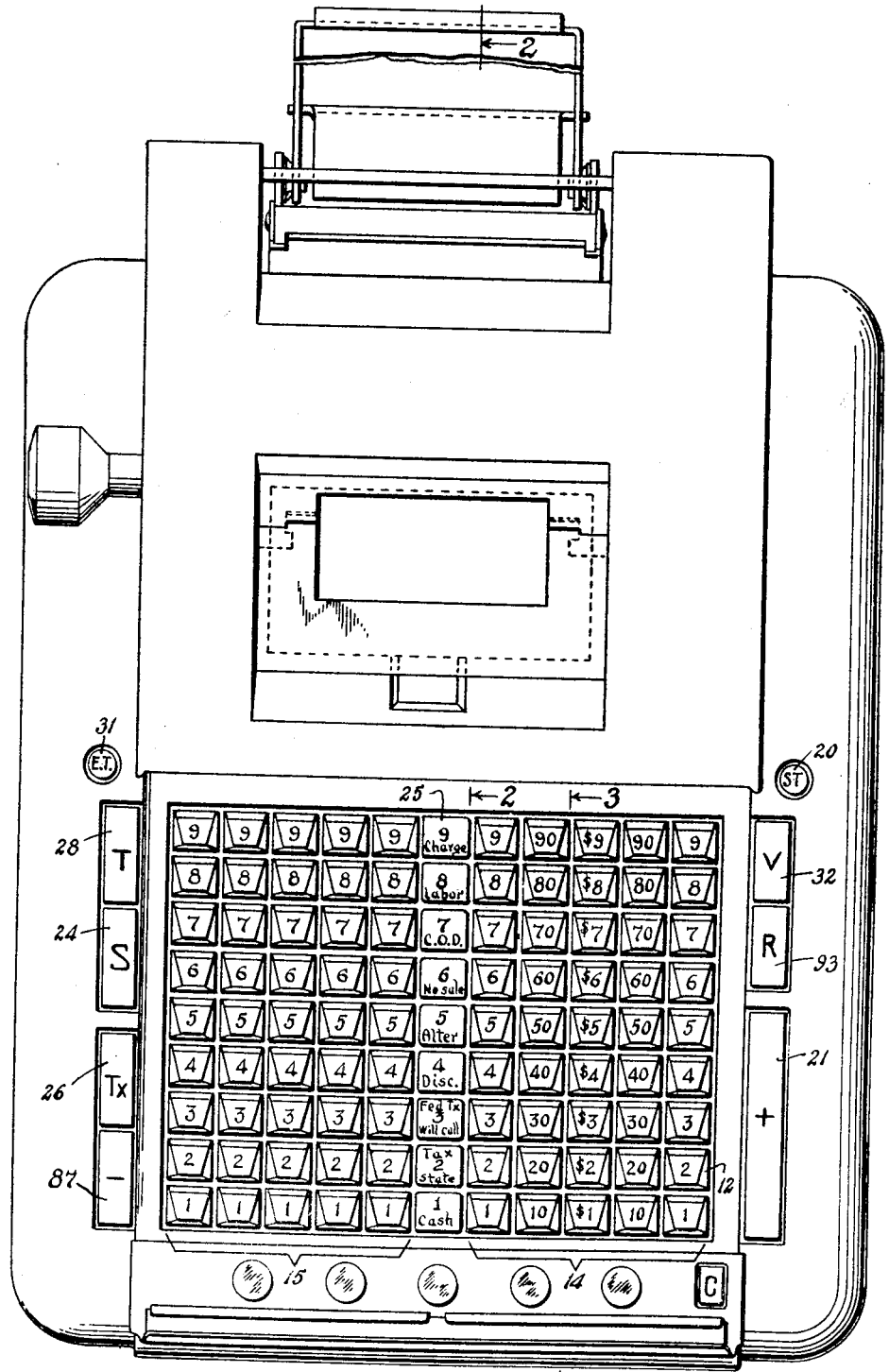
FIG. 1 is a plan view of a machine embodying the present invention.

The sales transaction machine shown generally in FIG. 1 embodies mechanism which is basically similar to that found in the well-known Clary adding machine and reference is therefore made to the R. E. Boyden Patent No. 2,583,810 issued on January 29, 1952, and the E. P. Drake Patent No. 2,472,696, issued on June 7, 1949, for details of the basic Clary adding machine. Accordingly, only those portions of such mechanism which relate to or form part of the present apparatus will be described in detail herein. This application is a division of the copending Scozzafava et al. patent application, Serial No. 682,551, filed September 6, 1957 now Patent No. 3,017,081. Reference may be had to such application for details of the machine not specifically disclosed herein.

The machine is of the full keyboard, rack driven type and comprises a plurality of denominationally arranged differential actuator racks 11 (FIGS. 2 and 3), each differentially controlled by a row of nine amount keys 12. The racks are operatively associated with respective orders of a printer section generally indicated at 13 (FIG. 2) and with an accumulator section generally indicated at 14 (FIG. 3).

The keyboard is divided into two sections, the right hand section 14 including five rows of amount keys for entering the monetary amount of a sales transaction, the keys in each row ranging progressively in digital value from 1 to 9. The left hand section 15 of the keyboard includes six rows of keys for the purpose of entering various identification matter pertaining to the sales transaction.

Describing first the general operation of the machine in effecting a sales transaction, a start key 20 (FIGS. 1, 7, 8 and 9), which forms part of a machine conditioning device, is first depressed. The latter conditions the machine and an associated tape punch (not shown) for operation and an associated tape punch for operation and releases any amount keys which may have been previously inadvertently or otherwise depressed. Thereafter, the amount of an item and the identification or catalog number of such item involved in the transaction are entered into the key sections 14 and 15, respectively. add bar 21 is then depressed causing operation of the machine to print such information on a preprinted form 22 (FIG. 4), as indicated on line 23 of the form. The form is automatically advanced and any number of additional items may likewise be entered and recorded.

After all items of a particular sales transaction have been entered, a subtotal key 24 is depressed to obtain a total to be used as the basis of computing any taxes required. Thereafter, the amount of tax is entered into the section 14, then one of several keys in a key row 25 is set to indicate the type of tax, and the tax bar 26 is depressed, entering the amount of the taxes in the accumulator and recording the same as indicated in line 27 of FIG. 4. Different types of taxes may be entered on successive lines. A total key 28 is then depressed to obtain a total of the amount due in the transaction. This amount is printed in a line 29 following the last tax or special charge entry.

Thereafter, a code representing the type of transaction, i.e., cash, charge, C.O.D., etc., is entered in the row of keys 25 and the sales person's identification number is entered in one or more of the remaining rows of key section 15. The add bar is again depressed to enter this amount which is recorded, as indicated on line 30, on the receipt form.

Thereafter, an "end-of-transaction" key 31 (forming part of a machine deconditioning device) is depressed which causes a cycle of operation of the machine to automatically record the date (as set in a date section of the printer), machine number, section number and transaction number, as indicated on line 31 on the receipt form. The latter key disables the machine, requiring reenablement thereof by depression of the start key 20 as an incident to the next sales transaction.

In the event of an erroneous entry of any data in the machine, a void bar 32 may be depressed at any time which clears the accumulator, requiring a new operation to be initiated by depression of the start key 20.

Describing now the construction of the machine, each of the amount keys 12 of the keyboard includes a key stem 33 (FIG. 3) guided for vertical movement in aligned slots formed in keyboard frame plates 34 and 35. The lower edges of the key stems cooperate with spaced shoulders 36 formed on the aligned racks 11 to limit the forward advancement of each rack to a number of increments corresponding to the numerical value of the key depressed in the associated row.

Spring means (not shown) are provided for normally holding the keys in their raised positions and means are further provided for latching each key in rack arresting position upon depression thereof. For this purpose, each key has a cam lobe (not shown) which is engageable by locking bail 37, there being one such bail in each row. Each bail is pivoted at its opposite ends to front and rear walls extending upwardly from the key frame plates 35. As a key is depressed, its cam lobe will move past the locking bail and as the lobe passes below the bail, the latter will be retracted partly by a spring 38 to a position wherein it latches the key in rack arresting position.

A zero block 40 depends from each locking bail 37 and, when no key in a row associated with the particular rack is depressed, the bail will locate the zero block in a position directly in front of one of the shoulders 36 thereby preventing forward movement of the rack during a subsequent cycle of the machine. However, when any amount key is depressed and latched down, its locking bail 37 will be held outwardly sufficiently to maintain its zero block out of the path of the aligned rack.

The machine is driven by a motor (not shown) through a cyclic clutch 42 (FIG. 5) having its driving side connected to a rotatable cam shaft 43. The clutch is effective to cause a complete rotation of the shaft 43 in a counterclockwise direction during each cycle of operation.

The machine is controlled to perform different operations by depressing corresponding machine control bars, certain of which have been described heretofore. The add bar 21 (FIG. 7) has two stems thereof slideably mounted in slots in the upper keyboard plate 34, the forward stem 44 thereof overlying a pin on a bell crank 45 which is fulcrumed on a frame pin 46 and is provided with a pin 47 lying directly behind a shoulder on an actuating link 48. The latter is guided at its rear end by a frame pin 50 embraced by elongated slot 51 in the slide.

The forward end of the slide is pivotally connected to an arm 52 fastened to a rock shaft 53 (see also FIG. 5) which is suitably pivoted in a manner not shown in the machine frame. Upon depression of the add bar, the bell crank 45 will be rocked counterclockwise against the action of a tension spring 49 causing the slide 48 to rock the shaft 53 clockwise. An arm 54 (FIG. 5) fastened to the shaft 53 engages a pin 55 on a clutch control bar 56, causing the latter to slide forwardly over frame pins 57 and 58, which are embraced by elongated slots in the bar. A hook 60 pivotally attached to the rear end of the bar normally hooks over a pin 59 on a trigger arm 61 to rock the latter clockwise about its fulcrum pin 62 against the action of a spring 63. The arm 61 is provided with a latching shoulder 64 normally lying directly in front of a roller 65 carried by a power slide 66. The latter is provided with elongated slots embracing the pin 62 and a frame pin 67. A relatively strong spring 68 is tensioned between the slide 66 and a frame pin 70 whereupon as the arm 61 is rocked to release the slide, the latter will be advanced sharply to the left in FIG. 5, causing a depending shoulder 71 to engage a pin 74 on a clutch dog 72 which is fulcrumed at 73 and normally held in its illustrated clutch disengaging position relative to the clutch 42 by a light tension spring 81. The clutch dog will thus be removed from engagement with the clutch, enabling the latter to become engaged for a complete cycle.

When the power slide 66 is driven to the left, a shoulder 75 thereon moves adjacent a pin 79 carried on a cam follower 76 (see also FIG. 14). The latter is pivotally mounted on a stationary shaft 77 and is urged counterclockwise by a spring 307 (FIG. 14) against a cam 78 keyed on the shaft 43. Part way through a machine cycle, the cam 78 becomes effective, through the follower 76, to move the slide 66 back to its normal illustrated position wherein it may be relatched by the arm 61, permitting the clutch dog 72 to be returned clockwise by the spring 81 to its normal clutch disengaging position.

The clutch dog 72 is also effective, when rocked counterclockwise to cause engagement of the clutch, to rock a switch control lever 80 against the action of the spring 81 to thereby close a normally open switch 82 in the machine motor circuit.

Pins 83, 84, 85 and 86 underlying the stems of the control bars 24, 26, 28 and a minus control bar 87, respectively, are fixed to individual arms, like arm 88, all pivoted on frame pins, like pin 90, and urged into their upper illustrated positions by individual springs (not shown). It will be noted that the clutch control bar is provided with inclined slots, like slot 91, underlying each of the above pins whereby depression of any of the control bars 24, 26, 28 and 87 will move the control bar to the left to cause engagement of the clutch. It will be noted that when the control bar is moved to the left by depression of one of the above control bars, shoulders, like shoulder 92, thereon will prevent depression of any of the other control bars.

A repeat bar 93 (FIG. 7) is provided to cause repetitive cycles of the machine to repetitively enter an amount set up in the keyboard. For this purpose, the stem of the repeat bar overlies a pin 94 carried on an arm 95 fulcrumed on the frame pin 50 and urged clockwise by a spring 96. When the repeat bar is depressed, the arm 95 is rocked counterclockwise causing a pin 97 thereon to engage a projection 98 on the slide 48, causing the latter to advance to clutch engaging position by rocking the shaft 53.

The stem of the void bar 32 overlies a pin 100 on a bell crank 101 (see also FIG. 8) which is fulcrumed on a frame pin 102. The pin 100 overlies a forwardly extending arm of a bail 103 (FIG. 8) fulcrumed at 104 and extending across the machine where it is provided with a second arm 105 (FIGS. 5, 11, 12 and 13)

overlying the pin 85 associated with the total bar 28. Thus, as the void bar 32 is depressed, the bail 103 is rocked counterclockwise to depress pin 85 and thus cause engagement of the clutch in the same manner as does the total bar 28.

The bail 103, when rocked into a counterclockwise position, is maintained in such position and, for this purpose, the bail is provided with a latching tip 99 which is pivoted thereon at 106 and urged upwardly by a spring 107 to engage the under-surface of a part 108 secured to the machine framework. As the bail 103 moved into its counterclockwise rocked position, a latching shoulder 110 on the tip 99 snaps in front of the part 108. In this position, a ledge 111 on the latch tip is located directly below a pin 112 carried by the stem of the start key 20. Accordingly, when the start key 20 is depressed, the pin 112 will release the latch tip 105, allowing the bail 103 and void key to return to their normal positions.

The start key 20 is not effective to cause operation of the machine, but is effective to release any depressed amount keys. For this purpose, the pin 112 also overlies one end of a lever 114 (FIG. 9) fulcrumed on frame pin 115 and provided with an ear 116 (see also FIG. 10) underlying an arm of a bell crank 117 fulcrumed on a frame pin 118. The latter bell crank underlies the arms of two bell cranks 120 and 121, both pivoted on a frame pin 122 and pivotally connected at their lower ends to key release bars 123 and 124, respectively. The latter bars are supported at their opposite ends by somewhat similar bell cranks 125 and 126, respectively. The release bar 123 is provided with projections 123a lying directly in front extensions on the key locking bails 37 associated with amount keys in the right hand keyboard section 14 (FIG. 1). The bar 124 is provided with projections 124a lying directly in front of the key latching bails associated with the amount keys in the left hand keyboard section 15. Accordingly, when the start key 20 is depressed to condition the machine for a new operation, the bell crank 117 will be rocked to shift both key release bars 123 and 124 to the right (in FIG. 10) to release any depressed amount keys.

The end-of-transaction key 31 (FIGS. 1, 5, 11, 12 and 13) is effective to cause operation of the machine to record the information indicated on line 31 of FIG. 4 and, for this purpose, its stem carries a pin 127 engageable with a camming surface 128 formed on an extension of the bail 103 whereupon depression of the key 31 will cam the bail counterclockwise to depress the total bar operated pin 85 and effect engagement of the main clutch 42.

Means (not shown) are provided for yieldably advancing the racks 11 during the first half of a machine cycle and for returning them to their illustrated home positions after a printing operation and during the latter half of the cycle. The racks are provided with slots 130 (FIG. 2) and 131 (FIG. 3) which are slidably guided over support shafts 77 and 132, respectively. The shaft 132 is slidably mounted in suitable guide slots (not shown) in the frame of the machine.

In order to yieldably advance the various racks, each rack has opposed notches 133 located at the closed end of its slot 131, the notches being normally engaged by rollers 134 carried by pawls 135 pivotally mounted on the shaft 132. A tension spring 136 extends between each pair of pawls whereby to urge the latter outwardly and thus hold the rollers 134 in driving engagement with the notches 133, thereby yieldably advancing any racks which are otherwise free to do so. When any of the racks 11 is arrested by a depressed amount key stem or by a zero block 40, the rollers 134 will ride out of the notches 133 of the blocked rack and along the edge of its slot 131.

The racks 11 are each operatively entrained with a respective one of a series of numeral printing wheels 137 (FIG. 2) forming part of the data printer 13. Each printer wheel is provided with a series of type characters spaced therearound and advancing in value from "0" to "9."

Each printer wheel is rotatably mounted on an individual arm 138 loosely keyed on a printer control shaft 140 and spring urged clockwise by a spring 141. A gear 142, integral with each printer wheel, is maintained in continual mesh with an idler 143, also carried by the arm 138.

Except during printing operations, the arms 138 are held in their illustrated positions by the shaft 140 wherein the idlers 143 mesh with associated idler gears 144 journaled on a fixed shaft 145. The latter idler gear continuously mesh with offset rack sections 146 integral with respective ones of the various racks 11.

During the mid-portion of a cycle, and after the various racks 11 have been advanced to different positions differentially limited by depressed ones of the amount keys, the shaft 140 is rocked clockwise, allowing the springs 141 to likewise rock the arms 138 (if otherwise allowed to do so), causing the printing wheels 137 to move into printing contact with a printing ribbon (not shown) and a paper strip T comprising a series of the aforementioned preprinted forms 22 (FIG. 4) arranged in end-to-end fashion, as the strip passes over a platen 147.

After printing is effected, the arms 138 are returned to their normal positions by the shaft 140 and the racks are subsequently returned to their home positions.

A special symbol rack 150 (FIG. 11) is provided and is entrained with a special symbol type wheel (not shown) similar to the numeral type wheels 137, to print symbols indicative of the type of operation performed by the machine. The symbol type wheel is located next to the group of numeral type wheels and is carried by an arm similar to the arms 138 and controlled by shaft 140.

The symbol type wheel is set by the rack 150 through a pair of intermeshing gears 151 and 152. The latter is fixed on a shaft 153 on which is fixed a similar gear (not shown) meshing with an idler similar to the idlers 144 (FIG. 2) which is entrained with the symbol print wheel.

The symbol rack 150 is provided with guide slots 154 and 155 embracing shaft 77 and a frame stud 156, respectively. The rack is yieldably driven to the left during each machine cycle by the aforementioned drive shaft 132 which engages a notch in a pawl 157 pivoted at 158 to the symbol rack and urged upwardly by a spring 160 so as to cause the rack to yieldably follow the shaft 132 until the latter is blocked under control of different ones of the control keys. For this purpose, shoulders 161, 162 and 163 are formed on the symbol rack which are arranged to be differentially arrested by pins 83, 84 and 86 underlying the subtotal, tax and minus keys, when the rack has advanced three, two and one increments, respectively. A blocking ear 164 on the rack 150 is arranged to limit against the lower end of the stem of the total key 28 when the latter is depressed and after the rack has advanced four increments.

The rack 150 will advance six increments as an incident to depression of the void key until a shoulder 165 thereon engages a stop ear 166 on a lever 167 which is normally held in its position illustrated by a spring 168.

The symbol rack will advance to its fullest extent of seven increments as an incident to depression of the end-of-transaction key 31 and, for this purpose, a pin 170 is fastened to the stem of the key 31 and is effective upon depression of this key to engage the upper edge of the lever 167, lowering the stop ear 166 out of the path of the shoulder 165, so that the rack may advance until the right hand end of the slot 155 strikes the frame stud 156.

During add operations the symbol rack will be blocked from moving from its illustrated home position by mechanism to be described later. In such position, the symbol type wheel will be ineffective to print a symbol.

The pins 83 and 85 (FIG. 6) actuated by the subtotal and total bars, respectively, are connected to opposite ends of a cross head 227 which is connected at its center through a pin and slot connection 228 to a link 230. The latter is pivotally connected at 231 to a floating lever 232 which rests on a frame pin 233. The lever 232 is provided with a shoulder 237 which is normally located below the path of a pin 238 carried by a cam follower 218, the latter cooperating with a cam 216 on the shaft 43. Upon depression of either the total or subtotal bar, the cross head link 227 will be rocked downwardly to rock the link 232 counterclockwise about the pin 233 sufficiently to position the shoulder 237 directly in front of the pin 238. Accordingly, at the start of the cycle, the cam follower 218 will be rocked clockwise shifting the link 232 to the left in FIG. 12, thereby rocking the arm 531 clockwise.

During a totaling or subtotaling operation any depressed keys in the right hand section 14 of the keyboard are released by the lever 232 (FIG. 6). For this purpose, the lever 232 is connected by a link 530 to a key release lever 531 fulcrumed at 532 and having one portion thereof overlying the bell crank 125 (see also FIG. 10) which supports the left hand end of the key release bar for the locking bails 37 associated with the right hand section 14 of the keyboard. Accordingly, when the floating lever 232 is moved to the left at a beginning of a subtotal or total cycle, the bell crank 125 will be actuated, causing release of the locking bails 37. The latter locking bails associated with the right hand section 14 of the keyboard, are thus held out during the major portion of the cycle to permit advancing of the racks associated therewith to total out the accumulator. However, during total and subtotal operations, those lockings bails 37 associated with the racks which cooperate with left hand keyboard section 15 are left in their normal positions during forward rack movement, wherein their zero blocks 40 block their associated racks from movement, but the keys are released in the latter part of the cycle in the conventional manner by the bell crank 117. However, upon depression of the end-of-transaction key 31 the projection 535 thereon which overlies the bell crank 126, actuates the key release bar 124 and the portion of the lever 531 overlying the crank 125 actuates the bar 123 to rock all of the key locking bails 37 to thus permit all racks to move under control of their associated accumulator gears.

Means are provided to enforce a totaling operation to thus clear the right hand section of the accumulator before an end-of-transaction operation can be initiated. Fo rthis purpose, an interlock element 283 (FIGS. 11, 12 and 13) is pivotally supported on the pivot pin 104a and is yieldably held in either of its two positions by a detent 284 which is pivoted at 285 and urged into engagement with the interlock element by tension spring 286. In its normal position, the interlock element underlies the aforementioned pin 127 on the stem of the end-of-transaction key 31, preventing depression of the latter. A camming lever 287 is pivotally supported at 288 and is spring urged in a counterclockwise direction by a spring 290 to normally hold a pin 291 thereof at the bottom of a camming notch 292 formed in the stem of the total bar 28. Upon depression of the total bar, the interlock lever 287 is rocked clockwise causing an arm thereof to engage a pin 293 on the interlock element 283 to rock the latter into its position shown in FIG. 12 wherein it will permit depression of the key 31. During depression of the total bar, however, an arm of the camming lever 287 will be positioned directly below the pin 127, thereby preventing depression of the key 31 until the total bar has been returned to its undepressed position at the end of the cycle.

The end-of-transaction key, when depressed, is locked in such depressed condition and for this purpose a pin 537 is provided on the stem thereof which, when a key is depressed, passes below an inclined edge 538 of the slutch control bar 56. Since the key 31 also, through the bail 103, depresses the pin 85 associated with a total bar as mentioned heretofore, the clutch control bar 56 moves to the left, thereby trapping the key 31 bar 56 in a depressed position wherein it will stay until subsequently released by depression of the start key 30.

It will be recalled that the clutch control bar 56 (FIGS. 11 and 14) actuates the trip latch 61 for the power slide 66 through a hook 60. During each cycle of the machine the hook is released from the pin 59 on the latch to permit the latter to latch the slide 66 after it is returned by the pin 79, while at the same time the clutch bar 56 is retained in its forward position to lock out and prevent the depression of all control bars. However, the hook 60 is normally permitted to return rearwardly to again engage the pin 79 at the end of the cycle.

The hook 60 is provided with a pin 296 engageable by a camming lever 297 which is pivoted at 298 and normally held in its position illustrated in FIG. 14, by a tension spring 300 to hold a pin 301 in engagement with an arm 302 suitably fastened to the cam follower 76. As the cam follower 76 is rocked clockwise during the latter portion of each machine cycle, the arm 302 rocks the lever 297 counterclockwise to cam the hook 60 out of engagement with the pin 59. The engagement of the lever 297 with the pin 296 also holds the clutch bar 56 in a forward position until near the end of the cycle. Toward the end of the cycle, the cam follower 76 returns, permitting the lever 297 to normally reconnect the hook 60 with the pin 59 of the trip latch 61.

Although we have described our invention in detail and have therefore used certain terms and languages herein, it is to be understood that the present disclosure is illustrative rather than restrictive and that changes and modifications may be made without departing from the spirit or scope of the invention as set forth in the claims appended hereto.

Having thus described our invention, what we desire to secure by United States Letters Patent is:

1. A sales registering machine comprising the combination of a printing mechanism for printing a record of a sales transaction, differential actuating mechanism for said printing mechanism, means including depressible amount keys for differentially controlling said actuating mechanism, means for locking said keys in depressed condition, a machine deconditioning device effective to cause said printer to print data indicative of completion of a sales transaction and to render said locking means ineffective, and a machine conditioning device effective to enable said locking device.

2. A sales registering machine comprising the combination of an accumulator, a printer mechanism for printing a record of a sales transaction, differential actuating mechanism for said accumulator and said printer mechanism, settable means for differentially controlling said actuating mechanism, means normally preventing setting of said settable means, means including a machine conditioning key for disabling said preventing means; means including a depressible total key for totalling amounts from said accumulator; means including a machine deconditioning key for enabling said preventing means, and means for enforcing depression of said total key in advance of depression of said deconditioning key.

3. A sales registering machine comprising the combination of an accumulator, a printing mechanism for printing a record of a sales transaction, differential actuating mechanism for said accumulator and said printing mechanism, settable means for differentially controlling said actuating mechanism, means normally preventing setting of said settable means, means including a machine conditioning key for disabling said preventing means; means including a depressible key for totalling amounts from said accumulator; means including a machine deconditioning key for enabling said preventing means; and means for enforcing depression of said conditioning key, said total key, and said deconditioning key seriatim.

References Cited in the file of this patent

UNITED STATES PATENTS

| 2,088,434 | Racz | July 27, 1937 |
| 2,167,715 | Green | Aug. 1, 1939 |
| 2,639,857 | Spurlino et al. | May 26, 1953 |
| 2,698,139 | Goodbar et al. | Dec. 28, 1954 |

FOREIGN PATENTS

| 395,558 | Great Britain | July 20, 1933 |